(12) United States Patent
Hamdoon et al.

(10) Patent No.: US 10,704,300 B2
(45) Date of Patent: Jul. 7, 2020

(54) DEVICE AND METHOD FOR LOCKING A MOTOR VEHICLE DOOR CLOSED IN RESPONSE TO A SIDE IMPACT

(71) Applicant: FORD GLOBAL TECHNOLOGIES, LLC, Dearborn, MI (US)

(72) Inventors: Muhsin M. Hamdoon, Windsor (CA); Marwan Ahmad Elbkaily, Canton, MI (US); Yalla Mussa Abushawashi, Canton, MI (US); Bruce Richard Ghastin, Canton, MI (US); Daniel Carl Bejune, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 754 days.

(21) Appl. No.: 15/233,600

(22) Filed: Aug. 10, 2016

(65) Prior Publication Data

US 2018/0044948 A1 Feb. 15, 2018

(51) Int. Cl.
  *E05B 77/12* (2014.01)
  *B60J 5/04* (2006.01)
  *B60J 5/00* (2006.01)

(52) U.S. Cl.
  CPC .................. *E05B 77/12* (2013.01); *B60J 5/00* (2013.01); *B60J 5/0458* (2013.01); *B60J 5/0461* (2013.01)

(58) Field of Classification Search
  CPC ....... E05B 77/12; B60J 5/0458; B60J 5/0461; B60J 5/00
  USPC .... 296/146.6, 187.12, 146.9, 207, 202, 68.1
  See application file for complete search history.

(56) References Cited

U.S. PATENT DOCUMENTS

| 3,468,392 | A | * | 9/1969 | Hass | E05B 77/12 |
| | | | | | 180/281 |
| 3,819,228 | A | * | 6/1974 | Cornacchia | B60J 5/0458 |
| | | | | | 296/146.9 |
| 3,944,278 | A | | 3/1976 | Takahashi et al. | |
| 6,312,045 | B2 | | 11/2001 | Kitagawa | |
| 7,311,169 | B1 | | 12/2007 | Caliskan et al. | |
| 8,661,617 | B1 | * | 3/2014 | Kim | B60J 5/0451 |
| | | | | | 16/82 |
| 8,882,180 | B2 | * | 11/2014 | van Oirschot | B60J 5/0458 |
| | | | | | 180/289 |
| 2005/0127715 | A1 | * | 6/2005 | Carre | B60J 5/0458 |
| | | | | | 296/187.12 |
| 2015/0076864 | A1 | * | 3/2015 | Faruque | B60J 5/0458 |
| | | | | | 296/187.12 |

FOREIGN PATENT DOCUMENTS

| CN | 103573027 B | 12/2015 |
| DE | 102009041353 A1 | 4/2010 |

(Continued)

OTHER PUBLICATIONS

English Machine Translation of CN103573027B.
(Continued)

*Primary Examiner* — Jason S Morrow
*Assistant Examiner* — E Turner Hicks
(74) *Attorney, Agent, or Firm* — David Coppiellie; King & Schickli, PLLC

(57) ABSTRACT

A locking device is provided for a motor vehicle door. The locking device includes a body having a base, a stake, a lever, a gusset and a rotational axis. A method of locking a motor vehicle door closed in response to a side impact is also provided.

14 Claims, 6 Drawing Sheets

(56) References Cited

FOREIGN PATENT DOCUMENTS

| | | |
|---|---|---|
| DE | 102011121670 A1 | 8/2012 |
| DE | 102012020696 A1 | 5/2013 |
| DE | 102012020698 A1 | 5/2013 |
| DE | 102012108180 A1 | 5/2013 |
| FR | 2996171 A1 | 4/2014 |
| WO | 2005061251 A2 | 7/2005 |

OTHER PUBLICATIONS

English Machine Translation of DE102009041353A1.
English Machine Translation of DE102011121670A1.
English Machine Translation of DE102012020696A1.
English Machine Translation of DE102012020698A1.
English Machine Translation of DE102012108180A1.
English Machine Translation of FR2996171A1.
English Machine Translation of WO2005061251A2.

\* cited by examiner

DEVICE AND METHOD FOR LOCKING A MOTOR VEHICLE DOOR CLOSED IN RESPONSE TO A SIDE IMPACT

TECHNICAL FIELD

This document relates generally to the motor vehicle equipment field and, more particularly, to a locking device adapted to lock a motor vehicle door in a closed position in response to a side impact.

BACKGROUND

The 20 mile per hour oblique pole side impact test is performed in order to test the integrity of the door system of a motor vehicle. More specifically, the door should stay latched/closed during the test or simulated crash event.

This document relates to a new and improved locking device and related method of locking a motor vehicle door closed in response to a side impact such as the one simulated by the 20 mile per hour oblique pole test.

SUMMARY

In accordance with the purposes and benefits described herein, a locking device is provided for a motor vehicle door. That locking device comprises a body including a base, a stake, a lever, a gusset and a rotational axis. The base, the stake and the lever may be joined together at the rotational axis.

In at least one possible embodiment, the lever includes an arcuate distal end. In at least one possible embodiment, the stake includes a pointed distal end. Further the locking device may include an acute included angle between the stake and the lever. That acute included angle may be between 30 degrees and 60 degrees. In some embodiments that acute included angle may be between 42 degrees and 48 degrees. In still other embodiments that acute included angle may be about 45 degrees.

Still further, a gusset may be provided between the stake and the lever. In addition, the locking device may include a support plate. The based is fixed to this support plate which is in turn fixed by a structural adhesive or other appropriate means to a door outer panel of the motor vehicle.

In accordance with an additional aspect, a method is provided of locking a motor vehicle door closed in response to a side impact. That method comprises the steps of: (a) mounting a locking device to a door outer panel, that locking device including a stake and a lever, (b) piercing a rocker panel with a pointed distal end of the stake, (c) contacting a door inner panel with the lever and (d) rotating the locking device so as to lock the door outer panel to the rocker panel by means of the locking device.

That method may further include the step of piercing the door inner panel and a door opening panel with the stake before piercing the rocker panel. Further, the rocker panel may include an outer rocker panel and an inner rocker panel. In such a situation the method may further include the step of piercing both the outer rocker panel and the inner rocker panel with the pointed distal end of the stake.

In accordance with still another aspect, a method is provided of locking a motor vehicle door closed in response to a side impact wherein that method comprises the steps of: piercing a rocker panel with a locking device carried on the motor vehicle door and rotating a locking device to lock the motor vehicle door to the rocker panel.

In addition the method may include driving a pointed distal end of a stake of the locking device through the rocker panel by means of force generated by the side impact. Further, the method may include contacting a lever of the locking device with a door inner panel by means of the force generated by the side impact. That contact causes the rotating of the locking device to lock the motor vehicle door to the rocker panel.

In the following description, there are shown and described several preferred embodiments of the locking device and the related method. As it should be realized, the locking device and related method are capable of other, different embodiments and their several details are capable of modification in various, obvious aspects all without departing from the locking device and related method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the locking device and related method and together with the description serve to explain certain principles thereof. In the drawing figures.

Figure 2A:
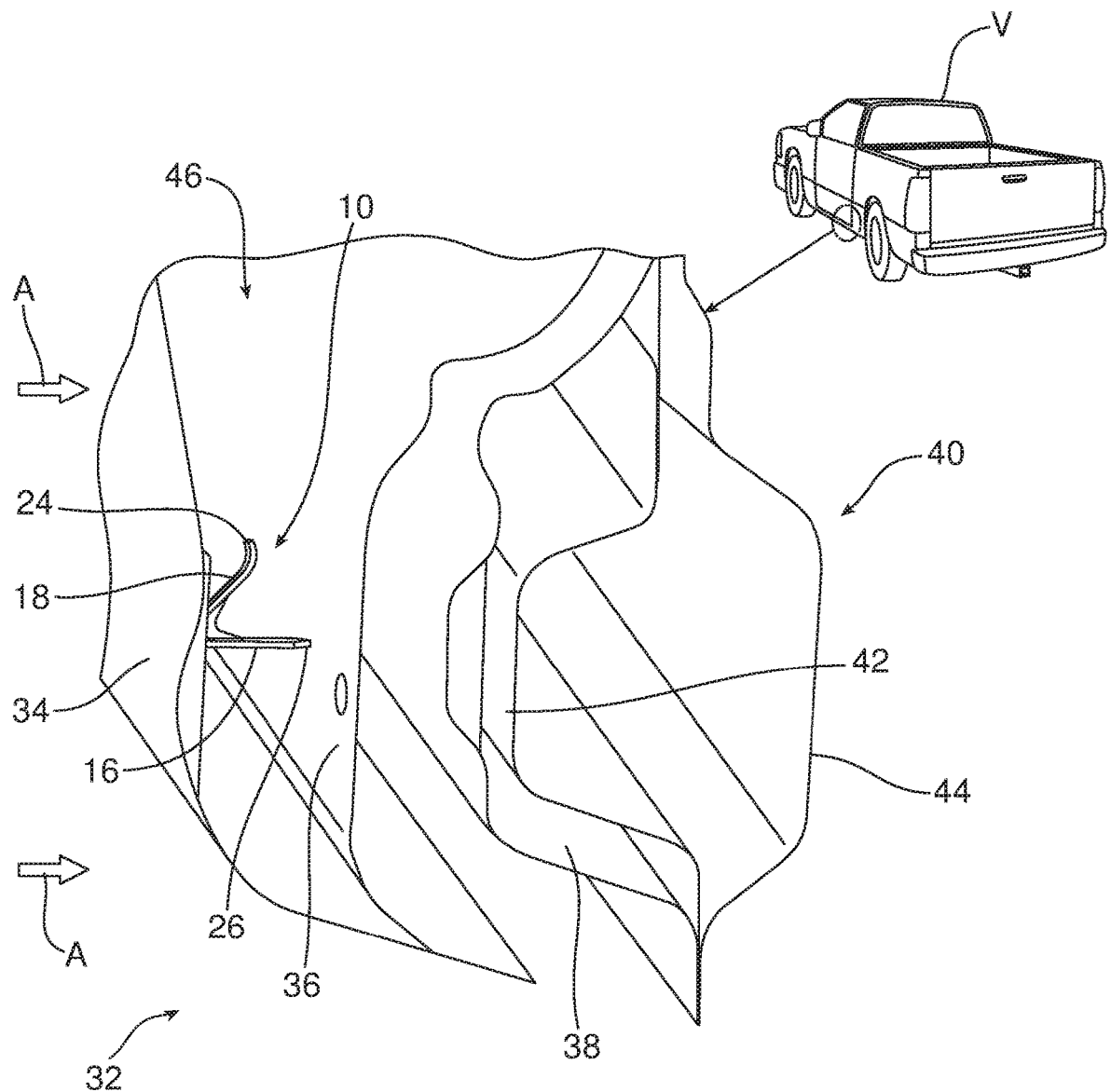
FIGS. 2a-2d are a series of illustrations showing how the locking device functions to lock the motor vehicle door in a closed position.
Figure 2B:
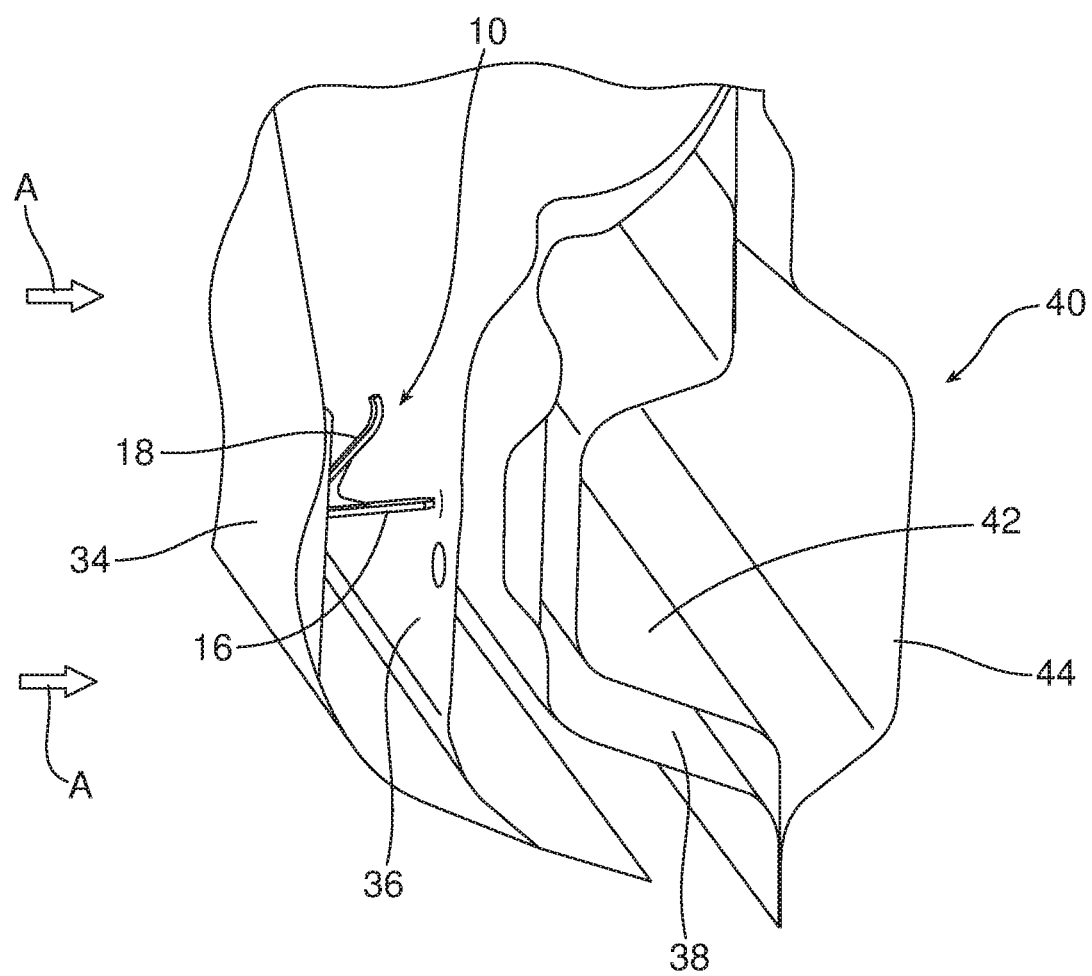
Figure 2C:
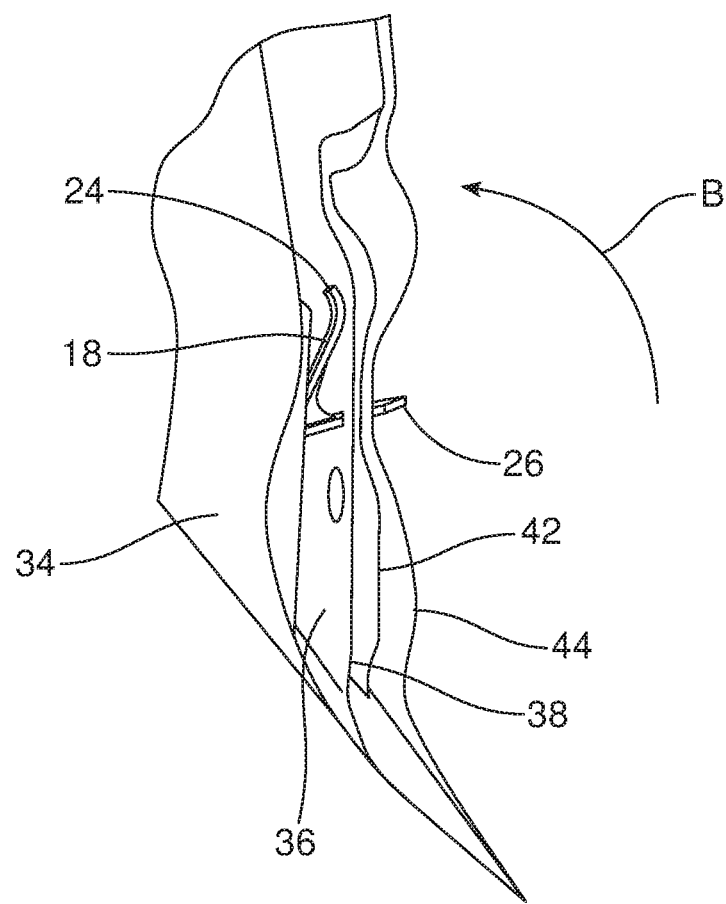
Figure 2D:
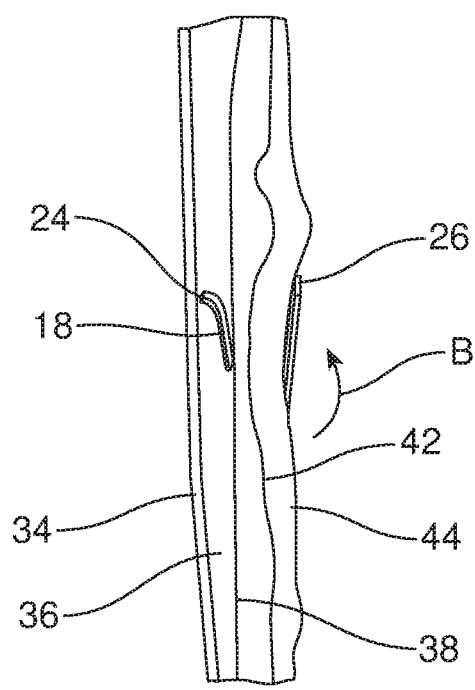

More specifically, FIG. 2a shows the locking device prior to side impact. FIG. 2b illustrates the pointed distal end of the stake of the locking device piercing the door inner panel. FIG. 2c illustrates the pointed distal end of the stake piercing the door opening panel, the outer rocker panel and the inner rocker panel which is prior to the lever of the locking device contacting the door inner panel. FIG. 2d illustrates the locking device after it has been fully rotated and functions to lock the motor vehicle door to the rocker panel.

Reference will now be made in detail to the present preferred embodiments of the locking device and related method, examples of which are illustrated in the accompanying drawing figures.

DETAILED DESCRIPTION

Figure 1:
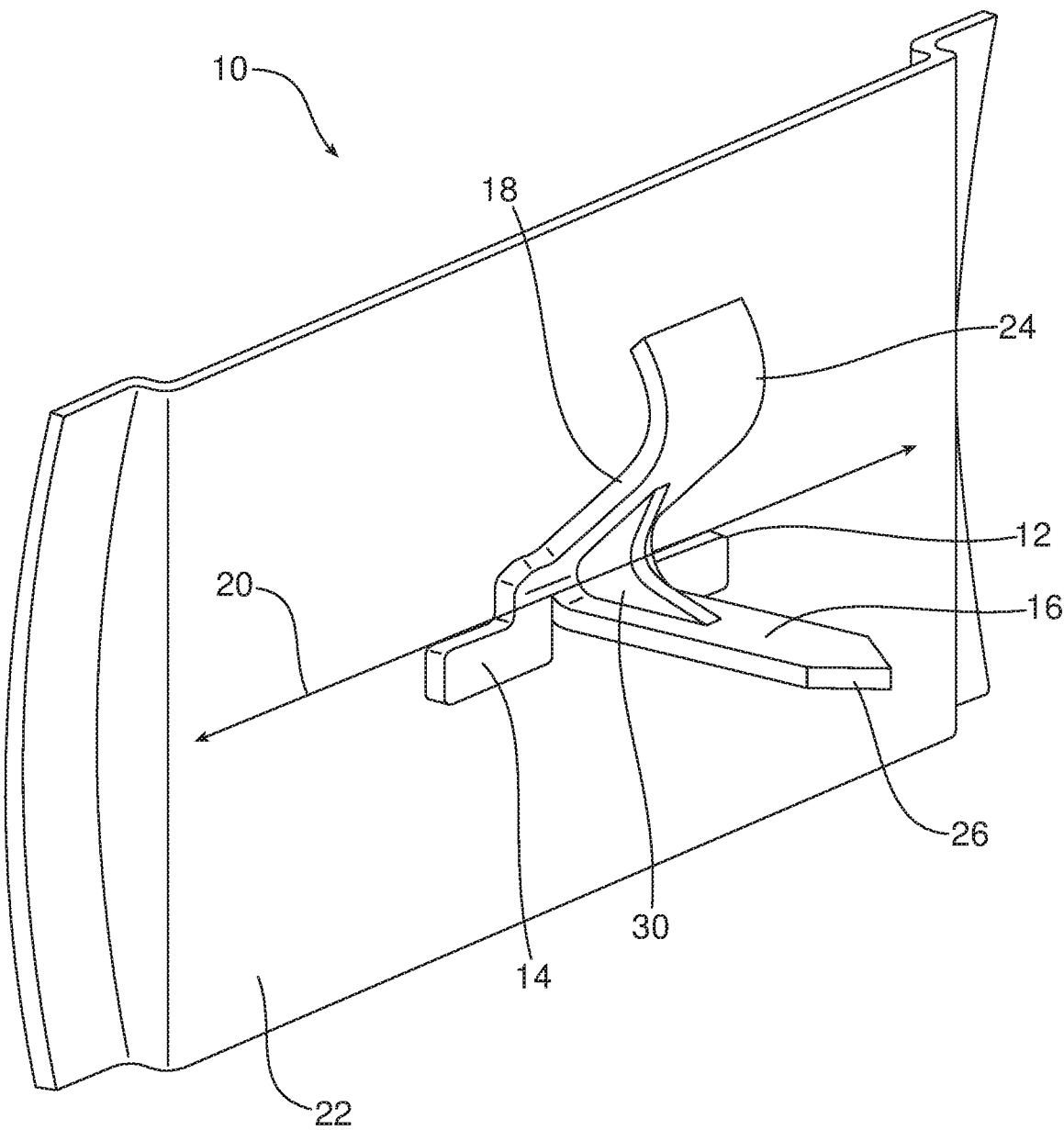
FIG. 1 is a detailed perspective view of the locking device.
Figure 1A:
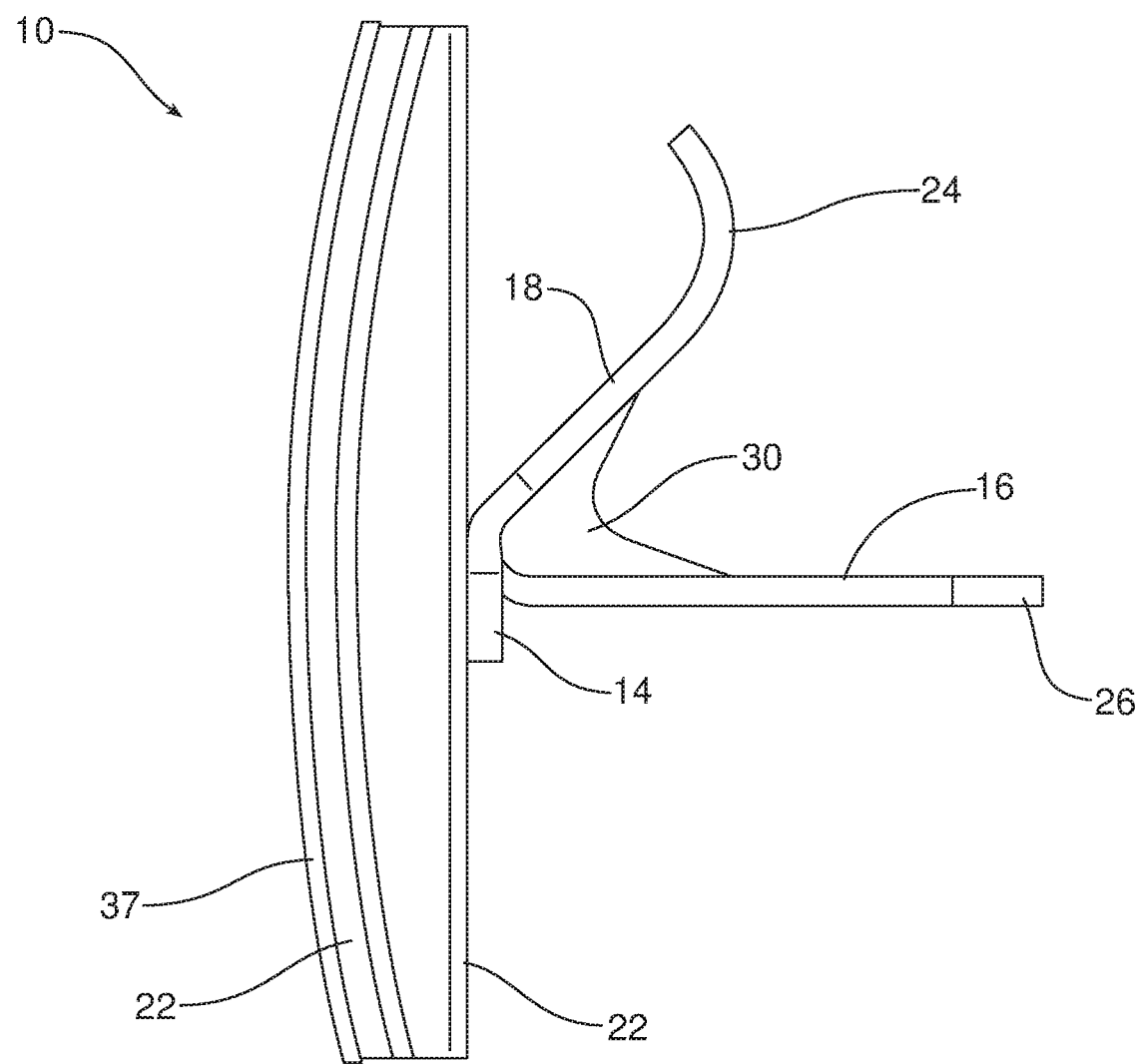
FIG. 1a is a side elevational view of the locking device illustrated in FIG. 1.

Reference is now made to FIGS. 1 and 1a showing the locking device 10 that functions to lock a motor vehicle door closed in response to a side impact. As illustrated, the locking device 10 includes a body 12 including a base 14, a stake 16, and a lever 18. As will be apparent from the following description, the body 12 also includes a rotational axis 20 and a support plate 22.

The rotational axis 20 is aligned with and generally falls along the attachment point between the base 14 and the support plate 22 which is also where the base 14, the stake 16 and the lever 18 are joined. In one possible embodiment, the base 14, the stake 16 and the lever 18 are all formed from a single integral piece of material. In another possible embodiment, the base 14, the stake 16, the lever 18 and the support plate 22 are all formed from a single integral piece of material.

In the illustrated embodiment, the lever 18 includes an arcuate distal end 24. The stake 16 includes a pointed distal end 26. An acute included angle 28 is provided between the stake 16 and the lever 18. That acute included angle may be between 30 degrees and 60 degrees. In some embodiments, that acute included angle 28 may be between 42 degrees and 48 degrees. In some embodiments, that acute included angle may be 45 degrees. In addition, a gusset 30 may be provided between the stake 16 and the lever 18 so as to reinforce and strengthen the body 12 across the acute included angle 28 formed between the stake and the lever.

As illustrated in FIG. 2a, the motor vehicle door 32 includes a door outer panel 34 and a door inner panel 36. When the motor vehicle door 32 is properly closed, the motor vehicle door seats against door opening panel 38 and the rocker panel 40 which includes a rocker outer panel 42 and a rocker inner panel 44.

The locking device 10 is secured to the motor vehicle door 32 in the interior space 46 between the door outer panel 34 and the door inner panel 36. More specifically, the support plate 22 is fixed to the inner surface of the door outer panel 34 by a structural adhesive 37 or other appropriate means. In one possible embodiment, the structural adhesive comprises a structural adhesive composition or any other strong adhesive. When properly seated to the door outer panel 34, the pointed distal end 26 of the stake 16 is oriented toward the door inner panel 36 while the lever 18 is oriented with the arcuate distal end 24 pointed upward.

In the event of a side impact of sufficient force, the door outer panel 34 is pushed in the direction of action arrow A (see FIGS. 2a and 2b) toward the door inner panel 36 causing the pointed distal end 26 of the stake 16 to pierce the door inner panel 36. Only milliseconds later, the pointed distal end 26 of the stake 16 pierces the door opening panel 38 and the rocker panel 40, including the rocker outer panel 42 and the rocker inner panel 44 (see FIG. 2c).

Milliseconds later, the arcuate distal end 24 of the lever 18 contacts the door inner panel 36 and this contact, in conjunction with the force generated by the side impact, causes the locking device 10 to rotate in the direction of action arrow B about the rotational axis 20 causing the stake 16 to pivot upwardly toward the door outer panel 34 thereby simultaneously locking the motor vehicle door 32 to the rocker panel 40 including both the rocker outer panel 42 and the rocker inner panel 44. In this way the locking device 10 ensures that the motor vehicle door 32 is secured and locked in the closed position, seated against the rocker panel 40. As should be appreciated, the locking device 10 engages the rocker panel 40 below the floor pan of the passenger compartment and away from the motor vehicle occupants. See FIG. 2a illustrating position of locking device 10 on the motor vehicle V.

In summary, the locking device 10 and the associated method of locking a motor vehicle door 32 closed in response to a side impact provides a number of benefits and advantages. During an oblique pole or similar side impact, the pointed distal end 26 of the stake 16 is driven through the door inner panel 36, door opening panel 38, and the rocker panel 40 (including the rocker outer panel 42 and rocker inner panel 44). The locking device 10 pierces these panels 36, 38, 42, 44 in a matter of milliseconds just prior to the arcuate distal end 24 of the lever 18 contacting the door inner panel 36 and causing the locking device to rotate or articulate around the rotational axis 20 at the attachment point between the base 14 and support plate 22. Advantageously, this rotation provides the inclination angle that ensures the bending of the locking device 10 upward. As a result, any subsequent deformation forces the locking device 10 to deform and bind the door inner panel 36, door opening panel 38 and rocker panel 40, including the rocker outer panel 42 and the rocker inner panel 44 together thereby preventing the impacted side door from opening. Advantageously, the locking device 10 even functions in this manner when the side door latch and the outside door handle are in the crash zone. This is true even when that crash zone consists of narrow objects such as a rigid pole or a tree.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A locking device for a motor vehicle door, comprising:
   a body including a base, a stake, a lever and a rotational axis;
   an acute included angle between said stake and said lever; and
   a gusset between said stake and said lever to reinforce the body across the acute included angle.

2. The locking device of claim 1, wherein said base, said stake and said lever are joined together at said rotational axis.

3. The locking device of claim 2, wherein said lever includes an arcuate distal end.

4. The locking device of claim 3, wherein said stake includes a pointed distal end.

5. The locking device of claim 1, wherein said acute included angle is between 30 degrees and 60 degrees.

6. The locking device of claim 1, wherein said acute included angle is between 42 degrees and 48 degrees.

7. The locking device of claim 1, further including a support plate, said base being fixed to said support plate.

8. The locking device of claim 7, wherein said support plate is fixed to a door outer panel of said motor vehicle.

9. The locking device of claim 1, wherein said lever includes an arcuate distal end.

10. The locking device of claim 1, wherein said stake includes a pointed distal end.

11. A method of locking a motor vehicle door closed in response to a side impact, comprising:
    mounting a locking device to a door outer panel, said locking device including a stake and a lever;
    piercing a rocker panel with a pointed distal end of said stake;
    contacting a door inner panel with said lever; and
    rotating said locking device so as to lock said door outer panel to said rocker panel by means of said locking device.

12. The method of claim 11, further including piercing said door inner panel and a door opening panel with said stake before piercing said rocker panel.

13. The method of claim 12, wherein said rocker panel includes an outer rocker panel and an inner rocker panel and said method includes piercing both said outer rocker panel and said inner rocker panel with said stake.

14. A method of locking a motor vehicle door closed in response to a side impact, comprising:
    piercing a rocker panel with a locking device carried on said motor vehicle door;
    rotating said locking device to lock said motor vehicle door to said rocker panel;

driving a pointed distal end of a stake of said locking device through said rocker panel by means of force generated by said side impact; and contacting a lever of said locking device with a door inner panel by means of said force generated by said side impact.

* * * * *